US 9,717,176 B2

(12) United States Patent
Stoffel et al.

(10) Patent No.: US 9,717,176 B2
(45) Date of Patent: Aug. 1, 2017

(54) AGRICULTURAL BLADES AND MACHINE PARTS WITH AMORPHOUS METAL LASER CLADDING

(71) Applicants: Neal J. Stoffel, Campbellsport, WI (US); Casey Placek, Fond du Lac, WI (US); Keith A. Johnson, Kewaskum, WI (US); Heather Baez, Fond du Lac, WI (US)

(72) Inventors: Neal J. Stoffel, Campbellsport, WI (US); Casey Placek, Fond du Lac, WI (US); Keith A. Johnson, Kewaskum, WI (US); Heather Baez, Fond du Lac, WI (US)

(73) Assignee: Kondex Corporation, Lomira, WI (US)

( * ) Notice: Subject to any disclaimer, the term of this patent is extended or adjusted under 35 U.S.C. 154(b) by 127 days.

(21) Appl. No.: 14/855,028

(22) Filed: Sep. 15, 2015

(65) Prior Publication Data
US 2016/0073582 A1   Mar. 17, 2016

Related U.S. Application Data

(63) Continuation of application No. PCT/US2015/018010, filed on Feb. 27, 2015.
(Continued)

(51) Int. Cl.
*B32B 3/10*   (2006.01)
*A01D 34/73*   (2006.01)
*B23K 26/34*   (2014.01)
*B23K 101/20*   (2006.01)
*B23K 103/00*   (2006.01)

(52) U.S. Cl.
CPC ............. *A01D 34/73* (2013.01); *B23K 26/34* (2013.01); *B23K 2201/20* (2013.01); *B23K 2203/00* (2013.01)

(58) Field of Classification Search
None
See application file for complete search history.

(56) References Cited

U.S. PATENT DOCUMENTS 3,063,310 A   11/1962   Connoy
3,859,865 A   1/1975   Conrad
(Continued)

FOREIGN PATENT DOCUMENTS

CN   103668177 A   3/2014
EP   0 462 484 A2   12/1991
(Continued)

OTHER PUBLICATIONS

Harvesting Equipment—Blades for Agricultural Rotary Mowers—Requirements; International Standard ISO 5718; Jul. 15, 2002; 10 pages; First edition; Geneva, Switzerland.
(Continued)

*Primary Examiner* — Christopher Polley
(74) *Attorney, Agent, or Firm* — Reinhart Boerner Van Deuren P.C.

(57) ABSTRACT

A laser cladded agricultural blade is provided. The blade includes a blade body. The blade body is of a first hardness. The blade body is additionally provided with a cladding material of a second hardness, wherein the cladding material comprises an amorphous metal. The cladding material is applied by a laser cladding process.

24 Claims, 10 Drawing Sheets

Related U.S. Application Data

(60) Provisional application No. 62/050,687, filed on Sep. 15, 2014, provisional application No. 62/050,880, filed on Sep. 16, 2014.

(56) References Cited

U.S. PATENT DOCUMENTS

| | | | |
|---|---|---|---|
| 3,937,317 A | 2/1976 | Fleury, Jr. | |
| 3,944,443 A | 3/1976 | Jones | |
| 4,416,656 A | 11/1983 | Shapiro | |
| 4,451,302 A | 5/1984 | Prescott et al. | |
| 4,466,533 A | 8/1984 | Shwayder | |
| 4,516,302 A | 5/1985 | Chulada et al. | |
| 4,530,204 A | 7/1985 | Brooks | |
| 4,645,404 A | 2/1987 | Juravic | |
| 4,660,361 A | 4/1987 | Remillard et al. | |
| 4,666,033 A | 5/1987 | Reid | |
| 4,842,126 A | 6/1989 | McConnell | |
| 4,909,026 A | 3/1990 | Molzahn et al. | |
| 4,949,836 A | 8/1990 | Schostek | |
| 5,016,747 A | 5/1991 | Veenhof | |
| 5,018,347 A | 5/1991 | Feilen | |
| 5,092,453 A | 3/1992 | Bruke | |
| 5,181,461 A | 1/1993 | Viaud | |
| 5,209,053 A | 5/1993 | Verbeek | |
| 5,213,202 A | 5/1993 | Arnold | |
| 5,444,969 A | 8/1995 | Wagstaff et al. | |
| 5,673,618 A | 10/1997 | Little | |
| 5,823,449 A | 10/1998 | Kooima et al. | |
| 6,089,334 A | 7/2000 | Watts | |
| 6,155,705 A | 12/2000 | Douris et al. | |
| 6,402,438 B1 | 6/2002 | Boyer | |
| 6,543,211 B1 | 4/2003 | Talbot | |
| 6,594,975 B2 | 7/2003 | Anstey et al. | |
| 6,634,781 B2 | 10/2003 | Bowens et al. | |
| 6,857,255 B1 | 2/2005 | Wilkey et al. | |
| 6,962,040 B2 | 11/2005 | Talbot | |
| 7,206,350 B2* | 4/2007 | Korobkov | H04L 5/0037 370/208 |
| 7,478,522 B1 | 1/2009 | Lovett et al. | |
| 7,598,815 B2* | 10/2009 | Chen | H03B 21/00 331/16 |
| 7,677,843 B2 | 3/2010 | Techel et al. | |
| 7,827,883 B1 | 11/2010 | Cherng et al. | |
| 8,096,221 B2 | 1/2012 | Tarrerias | |
| 8,270,513 B2* | 9/2012 | Egri | H04L 27/2637 375/267 |
| 8,353,148 B2 | 1/2013 | Derscheid | |
| 8,464,506 B2 | 6/2013 | Schumacher et al. | |
| 8,484,938 B2 | 7/2013 | Cormier et al. | |
| 8,579,774 B2 | 11/2013 | Derscheid | |
| 8,662,131 B2 | 3/2014 | Cormier et al. | |
| 8,662,132 B2 | 3/2014 | Cormier et al. | |
| 8,805,304 B2* | 8/2014 | Yu | H03F 1/3258 455/114.3 |
| 2002/0131328 A1 | 9/2002 | Bowens et al. | |
| 2003/0066391 A1 | 4/2003 | Griffo et al. | |
| 2003/0072382 A1* | 4/2003 | Raleigh | H04B 7/0615 375/267 |
| 2005/0241140 A1 | 11/2005 | Baer et al. | |
| 2005/0271161 A1* | 12/2005 | Staszewski | H03F 1/0205 375/308 |
| 2007/0163128 A1 | 7/2007 | Tarrerias | |
| 2007/0261867 A1 | 11/2007 | Techel et al. | |
| 2008/0006016 A1 | 1/2008 | Snider et al. | |
| 2008/0034567 A1 | 2/2008 | Galbreath et al. | |
| 2008/0078656 A1 | 4/2008 | Rhodea et al. | |
| 2009/0088091 A1* | 4/2009 | Shen | H04B 1/0483 455/102 |
| 2009/0095214 A1 | 4/2009 | Whitfield | |
| 2009/0322143 A1 | 12/2009 | Krauter | |
| 2011/0009251 A1 | 1/2011 | Derscheid | |
| 2011/0067374 A1 | 3/2011 | James et al. | |
| 2011/0268163 A1* | 11/2011 | Fillatre | H04B 15/06 375/219 |
| 2012/0060379 A1 | 3/2012 | Culf | |
| 2012/0063871 A1 | 3/2012 | Wood | |
| 2012/0233974 A1 | 9/2012 | Cormier et al. | |
| 2013/0032047 A1 | 2/2013 | Marques et al. | |
| 2013/0111863 A1 | 5/2013 | Johnson et al. | |
| 2013/0233145 A1 | 9/2013 | Sotelo et al. | |
| 2013/0259165 A1* | 10/2013 | Boehlke | H04L 27/2647 375/340 |
| 2014/0041537 A1 | 2/2014 | Hubach et al. | |
| 2014/0130473 A1 | 5/2014 | Augustine et al. | |
| 2014/0233671 A1* | 8/2014 | Belot | H04B 1/406 375/295 |
| 2014/0373501 A1* | 12/2014 | McLawhorn | A01F 29/09 56/500 |

FOREIGN PATENT DOCUMENTS

| | | |
|---|---|---|
| EP | 2 200 914 A2 | 6/2010 |
| EP | 2 371 205 A1 | 10/2011 |
| EP | 2 499 896 A1 | 9/2012 |
| JP | 2009-126608 A | 6/2009 |

OTHER PUBLICATIONS

Hyungson Ki et al.; Process map for laser heat treatment of carbon steels; Optics & Laser Technology; 2012; 9 pages (2106-2114) vol. 44.

Sangwoo So et al.; Effect of specimen thickness on heat treatability in laser transformation hardening; International Journal of Heat and Mass Transfer; 2013; 11 pages (266-276); vol. 61.

* cited by examiner

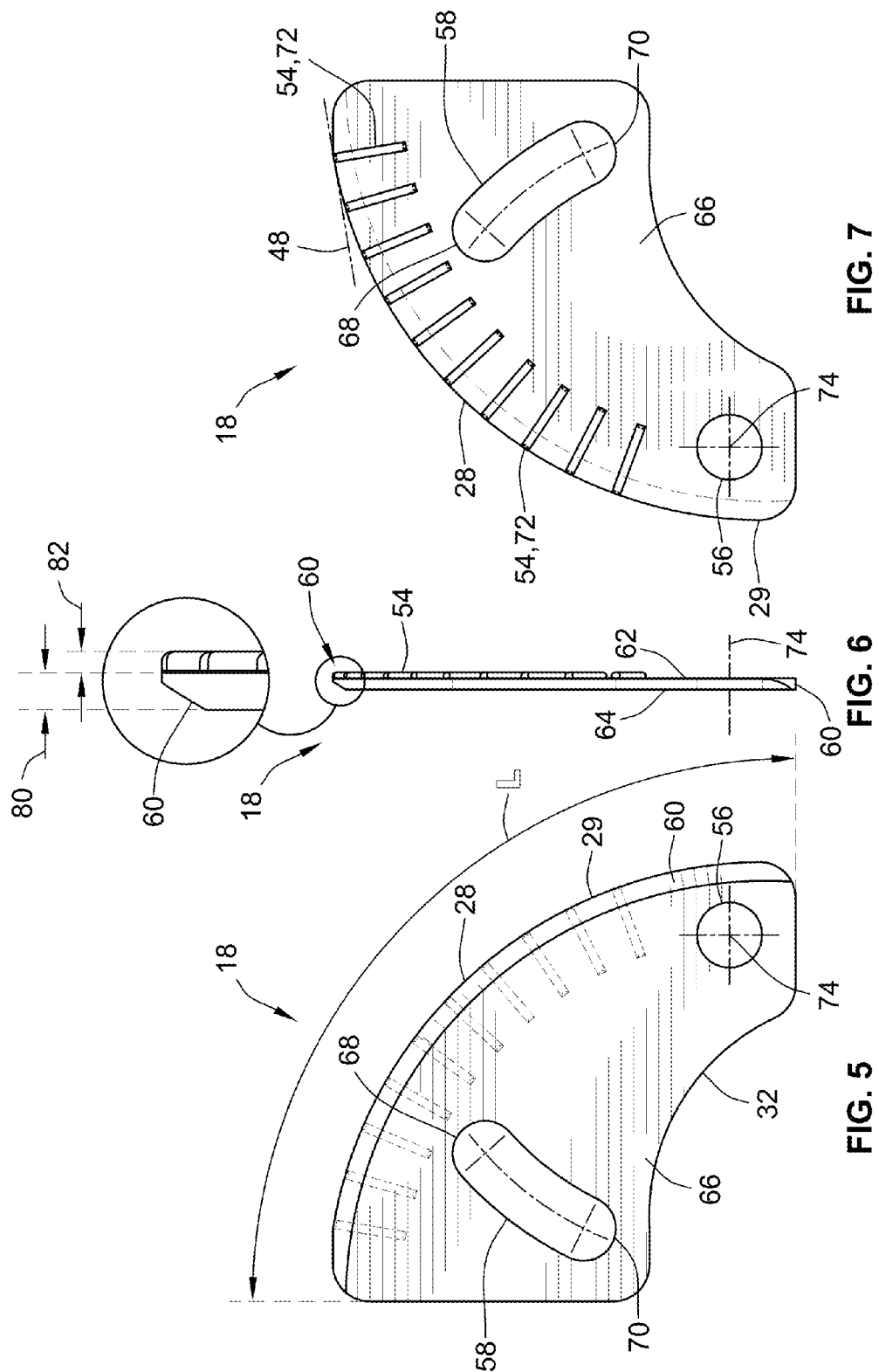

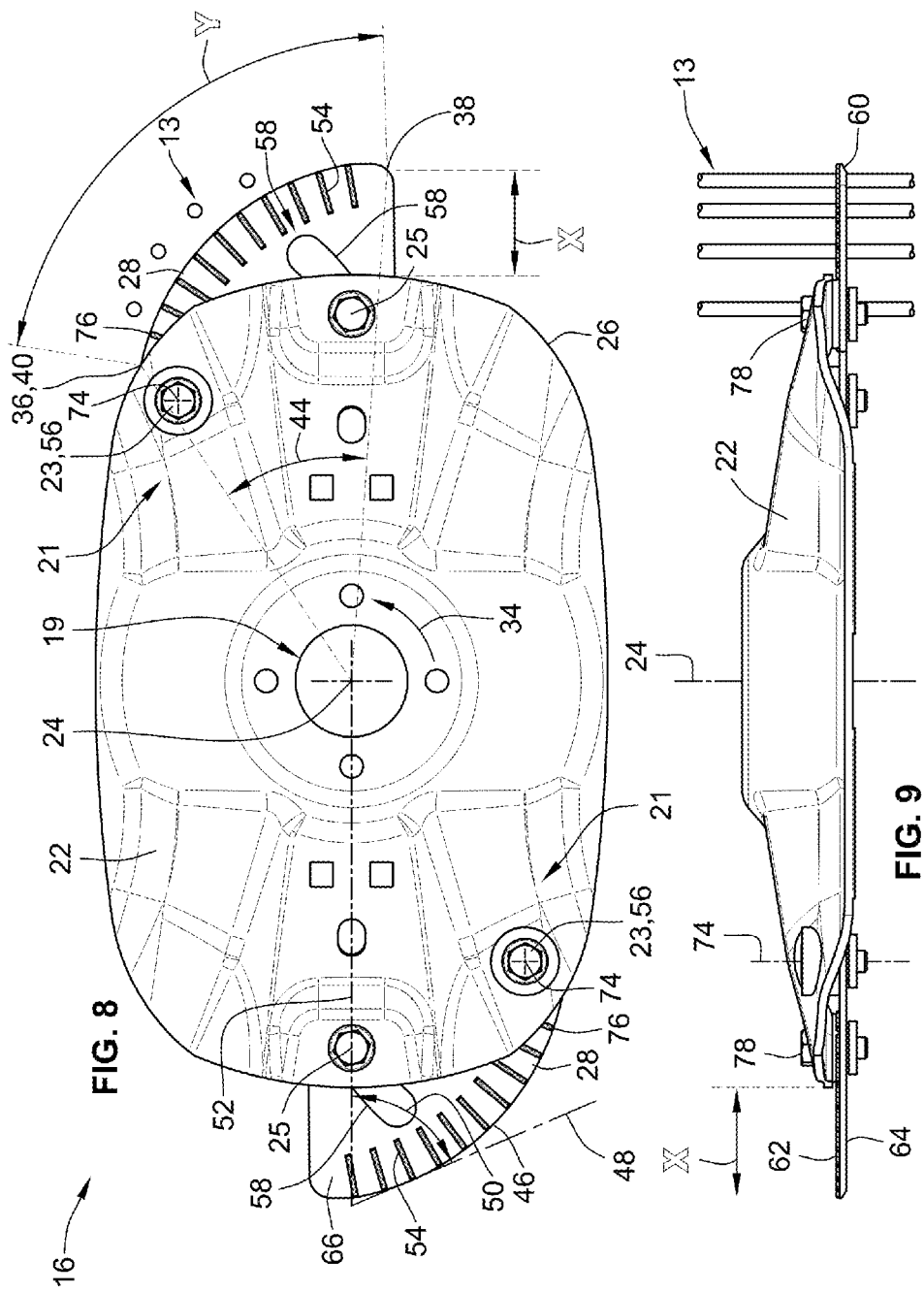

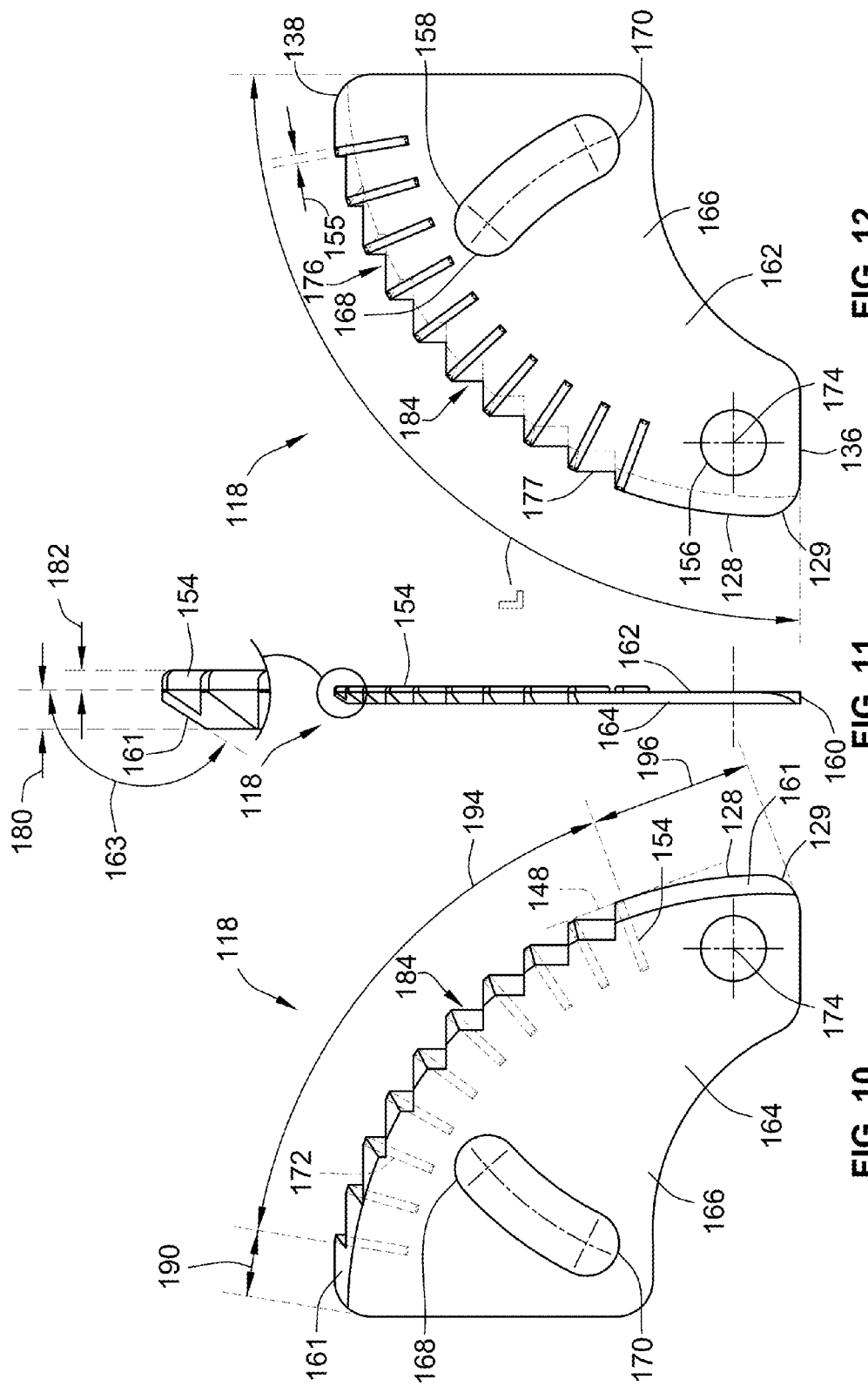

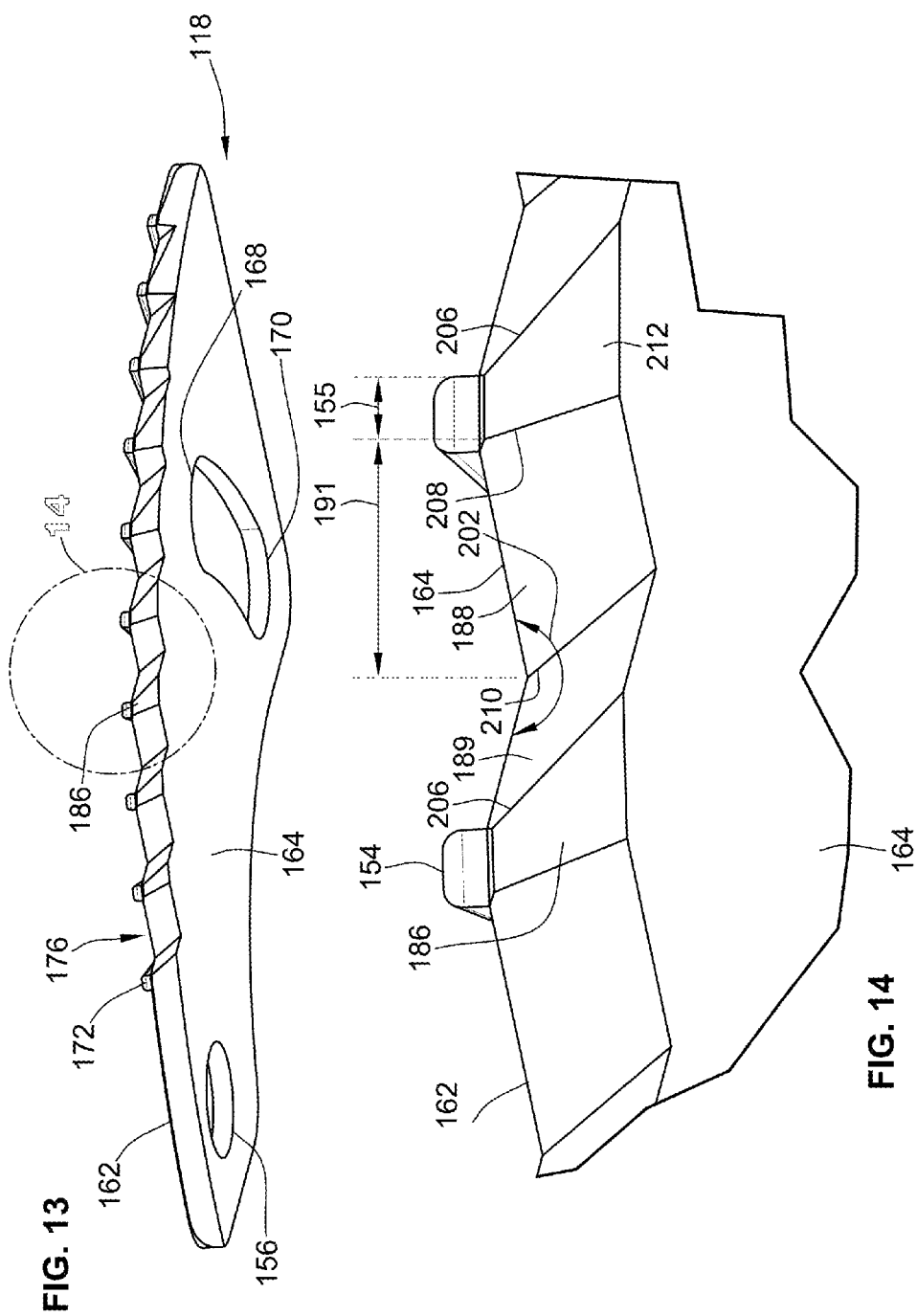

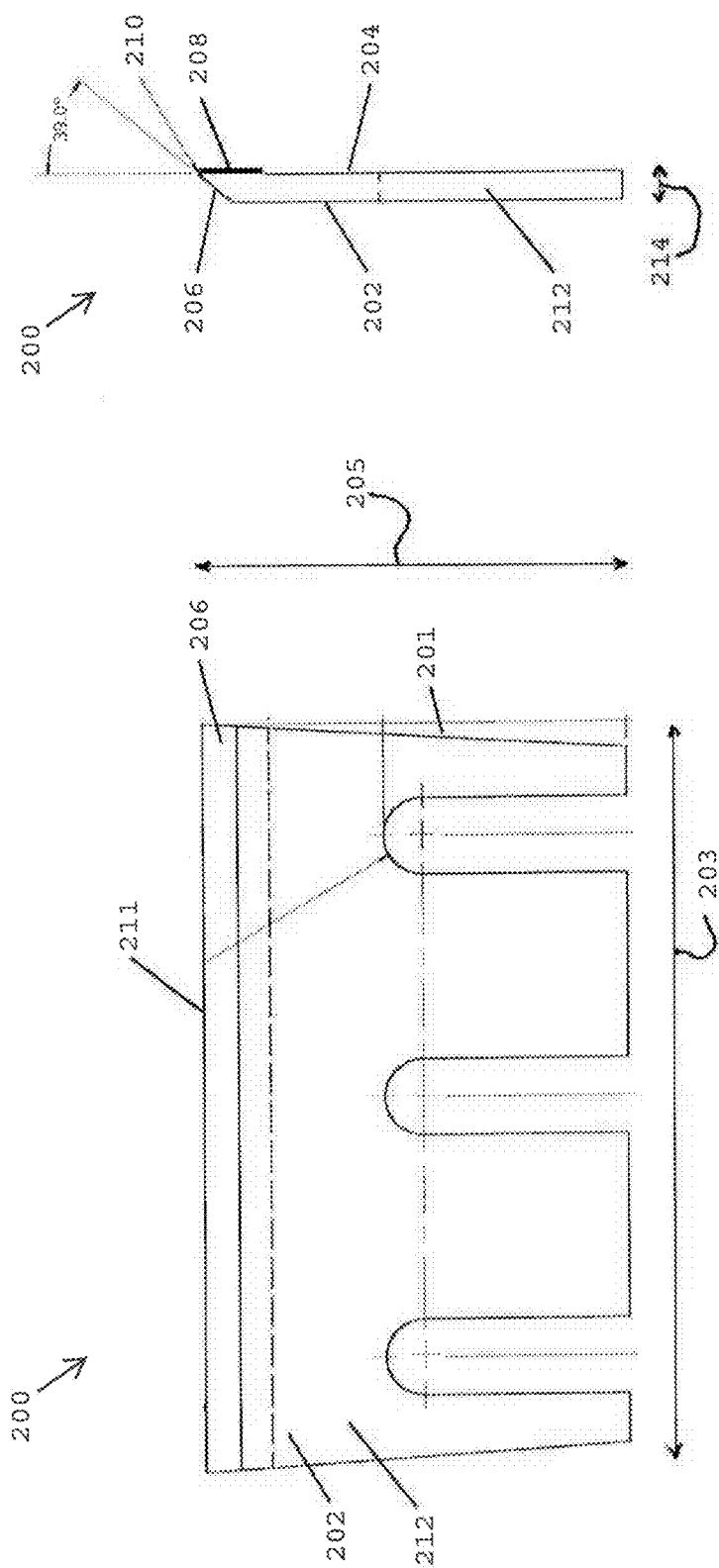

AGRICULTURAL BLADES AND MACHINE PARTS WITH AMORPHOUS METAL LASER CLADDING

CROSS-REFERENCE TO RELATED PATENT APPLICATIONS

This patent application is a continuation of co-pending PCT Application No. PCT/US2015/018010, filed Feb. 27, 2015, which claims the benefit of U.S. Provisional Patent Application No. 62/050,687, filed Sep. 15, 2014, and U.S. Provisional Patent Application No. 62/050,880, filed Sep. 16, 2014, the entire teachings and disclosure of which are incorporated herein by reference thereto.

FIELD OF THE INVENTION

This invention generally relates to mower disc blades (also referred to as knives) and other agricultural machine parts having a cladding material applied by a laser cladding process. The laser clad material may comprise an amorphous metal.

BACKGROUND OF THE INVENTION

Disc mowing machines are utilized to cut a crop while moving through a stand of the crop. Examples of such machines are shown for example in U.S. Patent Application Publication No. 2013/0111863, which is incorporated by reference in its entirety. The disc mowing machines may be either self-propelled or pulled, for example, by a tractor.

BRIEF SUMMARY OF THE INVENTION

Presently, many modern cutting blades used in agriculture, lawn and turf, forestry and recycling have some type of hard particle or hard alloy coating applied to keep the cutting edge sharp for a longer period of time. These coatings have various properties depending on the materials and the method of application. There are thousands of formulations for hard-facing materials and many ways to apply these hard-facing materials to a cutting edge. Many present coatings also contain some type of hard particles such as carbides or ceramics. These partials are very hard and good for wear resistance but, because of the properties of larger particles embedded in a finer-structured hard matrix, these particulate hard facing materials are brittle, which is to say, they are structurally weak and tend to chip or crack off of the cutting edge prematurely in use.

More recently, a new class of materials known as amorphous metals (also known as metallic glass or glassy metal) have been developed. These materials are a solid alloy/metallic material with a disordered atomic scale structure. In contrast, most metals are crystalline in there solid state, which means that they have a highly ordered arraignment of atoms. Amorphous metals are non-crystalline, and have a glass-like structure. The alloys contain atoms of significantly different sizes, leading to low free volume in the molten state. The viscosity prevents the atoms from moving enough to form an ordered lattice (crystalline structure). The absence of grain boundaries, the weak spots of crystalline materials, leads to better wear resistance and the alloying elements in this material provide excellent corrosion resistance. More recently, these amorphous metal material have become available in a metal powder form, primarily used in the aerospace industry and in oil exploration industry to coat certain parts using a laser cladding process.

Certain embodiments of the present invention employ a powder which is metallurgically bonded to a substrate knife edge in more substantial thicknesses by utilizing the laser cladding process. Certain embodiments of the present invention may laser clad amorphous material to the cutting edge of a knife or blade. In one embodiment of the present invention, the amorphous metal cladding material may have an elemental composition (mole percent) of $Fe>18.0$, $Cr<20.0$, $W<15.0$, $B<10.0$, $Nb\ 10.0$, $Mo<10.0$, $V<5.0$, $Mn<5.0$, $C<5.0$, $Si<2.0$.

The present invention discloses the laser cladding process to apply an amorphous metal material to the cutting edges of cutting blades or knives and other machine parts used in the agricultural market and/or the lawn and turf market.

In one aspect, the invention provides a machine part for agricultural, turf, mining or construction equipment for processing material. The machine part includes a body comprising a base material. The machine part also includes a clad material deposited on the base material and forming at least one edge along the body. The clad material comprises a second hardness greater than the first hardness, and clad material is at least partially amorphous.

In one embodiment, the invention provides machine part including a material thickness defined between two sides of the machine part. The two sides define width and length spans that are each at least 5 times or more than the material thickness. The material thickness edge forms a periphery of the body and extends between the two sides, and the material thickness edge extends transversely between the two sides.

In another embodiment, clad material is deposited along the one of the two sides of the machine part.

In another embodiment, clad material is deposited along the material thickness edge of the machine part.

In another embodiment, the body includes a sheet steel formed component having a substantially uniform material thickness.

In another embodiment, the clad material is applied to less than 15 percent of surface area of the machine part.

In another embodiment, the clad material is less than 5 percent of the machine part by weight.

In another embodiment, the material thickness edge defines an angled cutting edge.

In a further embodiment, the angled cutting edge defines an acute angle between 30 and 60 degrees.

In another embodiment, the clad material is at least 10 percent amorphous.

In another embodiment, the clad material is at least 50 percent amorphous.

In another embodiment, the clad material forms a dilution zone at a juncture between the clad material and the base material. The dilution zone is a metallurgical bond between the base material and the clad material.

In another embodiment, the clad material has a maximum thickness of no greater than 1 millimeter in the direction of deposition.

In another embodiment, the clad material is deposited in a strip having a width of greater than 3 millimeters and length at least 5 times longer than the width.

In another embodiment, machine part includes a cutting edge. The clad material forms the cutting edge, or is deposited adjacent to the cutting edge.

In another embodiment, the machine part includes a material thickness defined between two sides. The machine part also includes an angled cutting face extending intermediate of the two sides to a tip that defines the cutting edge. At least part of the angled cutting face is free of the clad material and is an exposed surface of the base material.

In another embodiment, the clad material comprises an at least partially amorphous material. The material has an elemental composition comprising (by molar percent) Fe>18.0 percent, Cr<20.0 percent, W<15.0 percent, B<10.0 percent, Nb 10.0 percent, Mo<10.0 percent, V<5.0 percent, Mn<5.0 percent, C<5.0 percent, and Si<2.0 percent.

In another aspect, the invention provides method of laser cladding at least one surface of a machine part including a base material of a first hardness. The method includes laser cladding a cladding material onto a surface of the machine part to provide a hardened region. The hardened region has a second hardness greater than the first hardness. The cladding material comprises an amorphous metal. The surface is configured to engage with a flow of agricultural material.

In one embodiment, the cladding material is an amorphous metal powder prior to laser cladding.

In another embodiment, the cladding material is at least 10 percent amorphous after laser cladding.

In another embodiment, the cladding material is at least 50 percent amorphous after laser cladding.

In another embodiment, the cladding material does not include a carbide.

In another embodiment, the machine part is selected from the group consisting of a chopper, a fan blade, an auger flight, a grain elevator component, a knife guard, and a blade support.

In another embodiment, the machine part is selected from the group consisting of knife blade, a sickle blade, a serrated blade, and a rotary blade.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a bottom view of a the blade employed in the mower disc assembly of FIG. 4;

FIG. 6 is a side view of the blade of FIG. 5;

FIG. 7 is a top view of the blade of FIG. 5;

FIG. 8 is a top view of the mower disc assembly of FIG. 4;

FIG. 9 is a side elevation view of the mower disc assembly of FIG. 4;

FIG. 10 is a bottom view of a blade employed in the mower disc assembly of FIG. 4

FIG. 11 is a side view of the blade of FIG. 10;

FIG. 12 is a top view of the blade of FIG. 10;

FIG. 13 is a perspective view of the graduated cutting teeth of FIG. 10;

FIG. 14 is an exploded partial perspective view of the cutting teeth of FIG. 13;

FIG. 15 a top view of a grass knife of the present invention;

FIG. 16 is a side view of an exemplary grass knife of the present invention.

Figure 1:
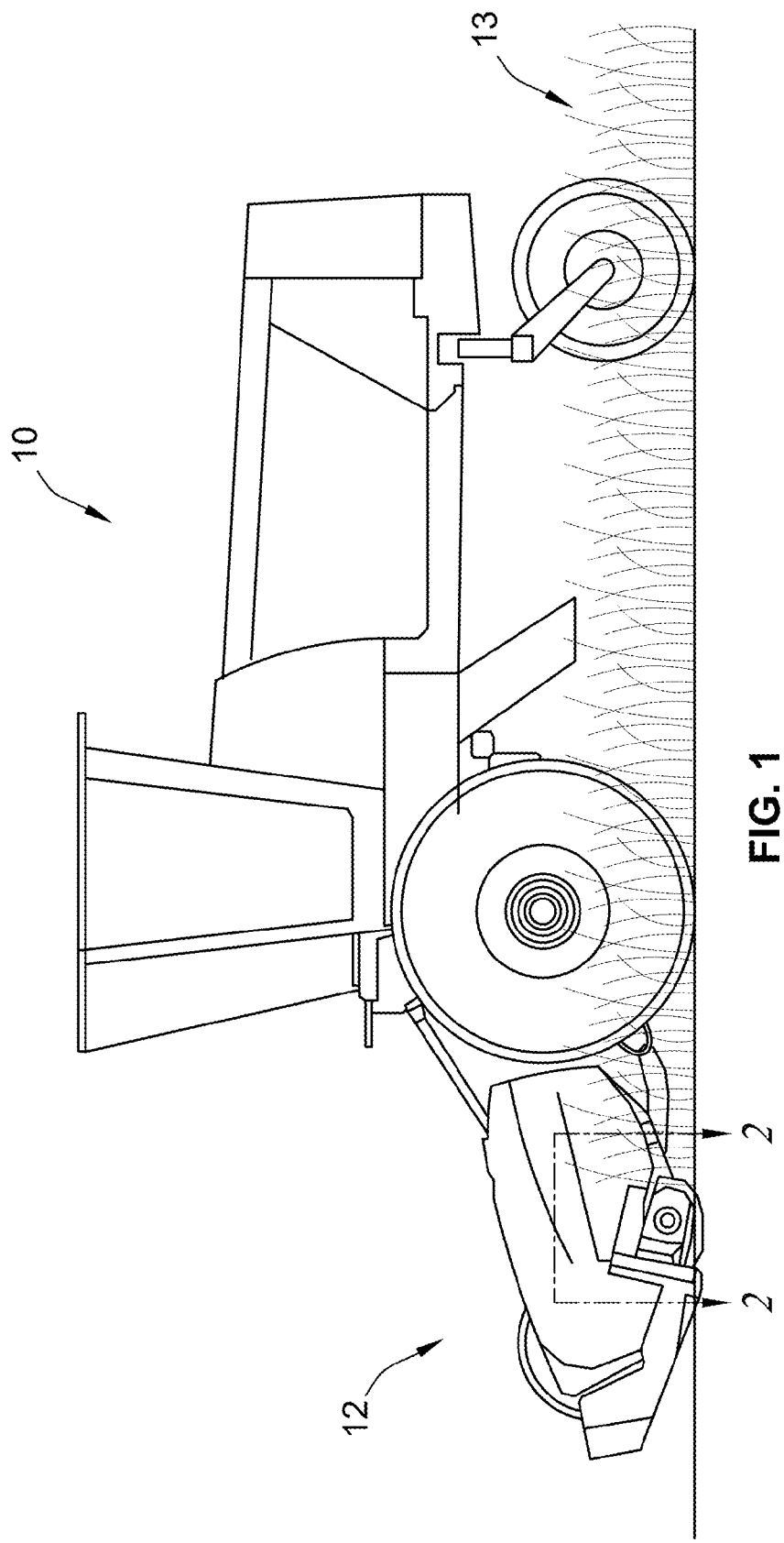
FIG. 1 is an illustration of a tractor operating a mowing machine.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Amorphous metal claddings may be used to impart advantageous properties to agricultural blades. An amorphous metal may refer to a solid metal material with a disordered atomic structure, that is, a non-crystalline, glass-like structure. Due to the amorphous structure, there are few or no grain boundaries. Grain boundaries, as well as traditional particulate hardening materials such as carbides, act as weak spots and may crack and spall from a blade surface or edge. In comparison, the uniform structure of an amorphous metal is highly resistant to microscale chipping and erosion, leading to reduced erosion and dulling, thereby providing superior edge retention. Additionally, the cladding material is extremely corrosion resistant, thereby reducing dulling of the cutting edge compared to typical knife edges. Amorphous metal materials are also both extremely hard and yet slightly elastic, allowing for good edge enhancement.

Laser cladding of agricultural blades may be performed with a very shallow heat affected zone. In particular, laser cladding an amorphous metal cladding material to a base material employs very localized application of heat, such that the base material may quench the cladding material at a sufficient cooling rate to produce an amorphous state. Additionally, the laser cladding process results in creation of a dilution zone between the base material and the clad material, the dilution zone having a metallurgic bond between the base material and the clad material.

Accordingly, the preferred laser cladding materials of the present invention comprise an amorphous metal. Particularly preferred are amorphous metal compositions and alloys having low critical cooling rates, sometimes referred to as bulk metallic glass materials. Rapid cooling of bulk metallic glasses produces a material that may be partially or fully amorphous. In some embodiments, the cladding material is at least 10 percent amorphous. In preferred embodiments, the cladding material is at least 30 percent amorphous. In still more preferred embodiments, the cladding material is at least 50 percent amorphous.

In a preferred embodiment, the cladding material may be supplied as an powder have an elemental composition (by molar percent) of Fe>18.0, Cr<20.0, W<15.0, B<10.0, Nb 10.0, Mo<10.0, V<5.0, Mn<5.0, C<50, Si<2.0. Other suitable compositions for the present invention include $(Zr,Ti)_a(Ni,Cu,Fe)_b(Be,Al,Si,B)_c$, where a is in the range of from about 30 to 75, b is in the range of from about 5 to 60, and c in the range of from about 0 to 50 in atomic percentages. One exemplary bulk amorphous alloy family is defined by the molecular formula $(Zr,Ti)_a(Ni,Cu)_b(Be)_c$, where a is in the range of from about 40 to 75, b is in the range of from about 5 to 50, and c is in the range of from about 5 to 50 in atomic percentages. One exemplary bulk amorphous alloy composition is $Zr_{41}Ti_{14}Ni_{10}Cu_{12.5}Be_{22.5}$. Generally, any bulk metallic glass (or alloy composition) may be used in the present invention. Preferably, amorphous alloys that can be cooled to an amorphous state at cooling rates as low as 500K/sec or less are employed, allowing production of cladding layers of at 1 mm or more. Exemplary embodiments of suitable amorphous compositions are disclosed in U.S. Pat. Nos. 3,871,836; 5,288,344; 5,368,659; 5,618,359; 5,735,975, 6,887,586, and RE29,989; all of which are incorporated herein by reference in their entirety. For embodiment of the present invention using laser cladding, these compositions are preferably in powder form. Other bulk metallic glasses known in the art or developed in the future may also be used without departing from the present invention. Alternatively, powdered materials suitable for plasma transfer arc welding (PTAW) may be used in a laser cladding process. In preferred embodiments, laser cladding of a PTAW material will result in a cladding that is at least partially amorphous. The amorphous cladding materials of the present invention may be used to replace traditional carbide cladding materials.

The amorphous clad material may comprise less than 15 percent by weight of the blade or machine part. However, in certain embodiments clad material may comprise less than 10 percent by weight of the blade or machine part. In yet other embodiments the clad material may comprise less than 5 percent by weight of the blade or machine part. Alternatively, the clad material may cover less than 15 percent of the surface area of the part. However, in certain embodiments clad material may cover less than 10 percent of the surface area of the part of the part. In yet other embodiments the clad material may cover less than 5 percent of the surface area of the part. It is noted that these numerical range parameters in this paragraph can apply to all the different embodiments and other figures discussed below, that is FIGS. 1-17.

FIG. 1 illustrates a tractor 10 operating a mowing machine 12 through a stand of crop 13. The mowing machine 12 may either be self-propelled or as shown here maneuvered and powered by the tractor 10.

Figure 2:
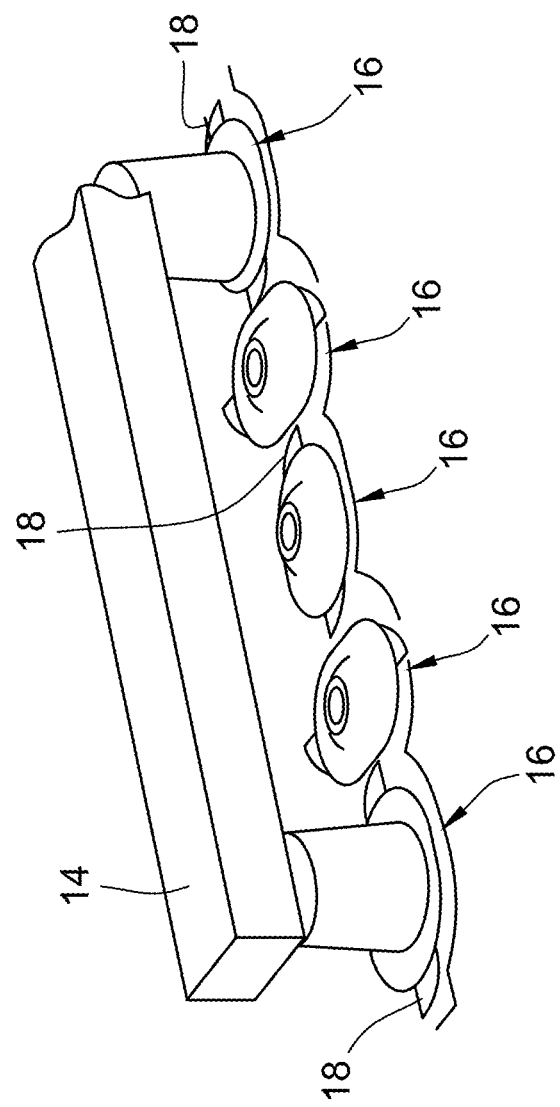
FIG. 2 is a partly schematic isometric illustration of a disc mower cutter bar including a plurality of discs holding a plurality of mower blades.

FIG. 2 illustrates a mower disc cutter bar 14 that forms a part of the mowing machine 12 shown in FIG. 1. The mower disc cutter bar 14 supports a plurality of mower disc assemblies 16, which in turn support a plurality of mower disc blades 18 (also known as cutter blades and/or knives).

Figure 3:
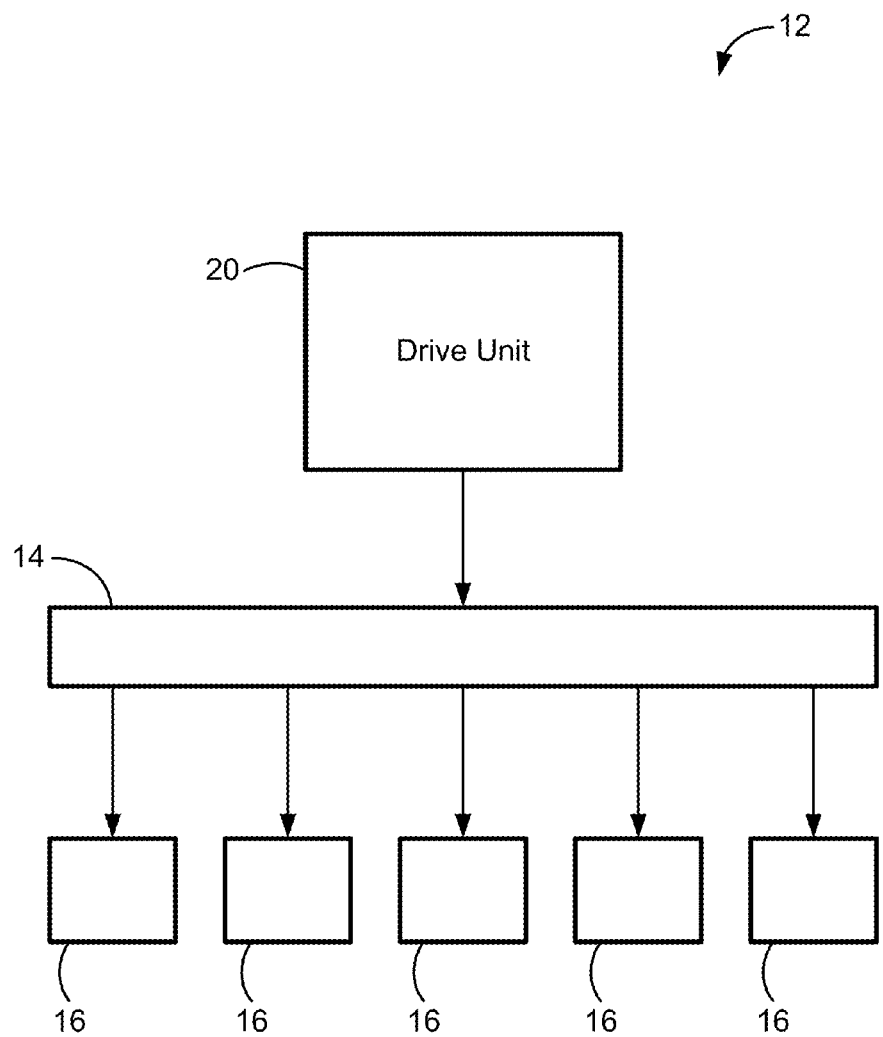
FIG. 3 is a schematic view of a mowing machine.

FIG. 3 illustrates a schematic view of a mowing machine 12. The mowing machine 12 includes a drive unit 20 for driving a rotary cutter bar 14. The rotary cutter bar 14 includes a plurality of mower disc assemblies 16 that each contain a plurality of slicing disc mower blades 18 (see FIG. 2). While the mowing machine 12 is illustrated as including a plurality of mower disc assemblies 16, it is contemplated that as few as one mower disc assembly 16 could be employed in certain applications.

Figure 4:
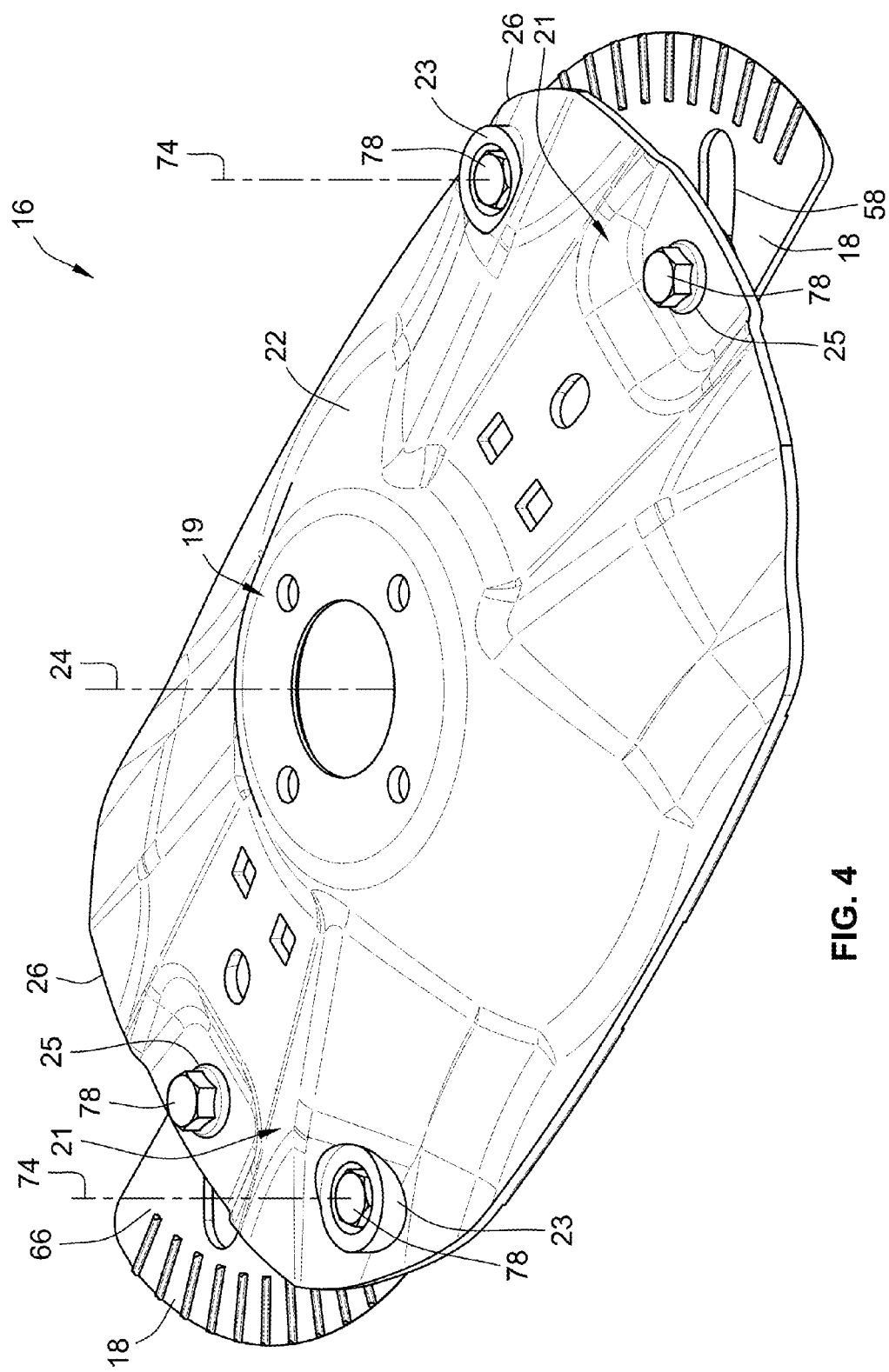
FIG. 4 is an isometric view of a mower disc assembly.

FIG. 4 illustrates an isometric view of a mower disc assembly 16 including slicing disc mower blades 18.

The mower disc assembly 16 includes a mower disc body 22. The mower disc body 22 defines a mounting location 19 which attaches to the rotary cutter bar 14 (see FIGS. 2-3) that is in turn driven by the drive unit 20. The drive unit 20 causes the mower disc assembly 16 to rotate about a mower disc body 22 that defines a central axis of rotation 24. The mower disc body 22 may include two blade mounting locations 21. Each blade mounting location 21 includes a first blade mounting location 23 and a second blade mounting location 25. In the embodiment shown in FIG. 4 the first and second blade mounting locations 23, 25 are apertures or boss structures through which fasteners 78 are inserted to mount blade 18. While two blade mounting locations 21 are illustrated it can be readily appreciated that only a single blade mounting location may be provided on the mower disc body 22 or more than two blade mounting locations 21 may be provide so long as the blade/blades 18 when mounted are balance during the rotation of the mower disc body 22.

As illustrated, the two blade mounting locations 21 are positioned toward a bottom of the mower disc body 22 so as to balance the blades 18 such that during rotation, the blades 18 will extend outwards beyond a mower disc body 22 outer periphery 26 under centrifugal force. Each blade 18 pivots about a blade body 66 axis of rotation 74. The pivoting motion is limited by a blade body retainer 58 that will be more fully described below. Accordingly, it is not the intent to limit the mounting location structures to apertures or bosses with bolts. Any suitable retainer structure to mount the blade 18 to the mower body 22 may be utilized provided the blade 18 may pivot outwards to extend beyond the mower body 22 outer periphery 26 under a centrifugal force generated by the mower disc body 22 in rotation.

As the mower disc assembly 16 is brought into contact with a crop 13 or foliage to be mowed, the cutter blades 18 will slicingly impact the crop or foliage and thereby slice an upper portion of the crop or foliage from its root system. This slicing of the crop will be more fully explained below. Additionally, outer periphery 26 of mower body 22 may also impact the crop or foliage, particularly at locations proximate to cutter blades 18, thereby causing unwanted wear to outer periphery 26 of mower body 22. Accordingly, exposed edges of outer periphery 26 proximate to cutting blade 18 may be optionally provided with a laser cladded material to reduce erosion and wear of mower body 22. In other embodiments, blade support structures subject to impacts and wear from agricultural materials Turning now to FIGS. 5, 6 and 7, respectively, a bottom view, side view and top view of a blade 18 for a mower disc body 22 are shown. The blade 18 may be stamped formed from sheet steel to include a blade body 66 of a hardness between HV 400 and 650 on Vickers scale. The blade body 66 has opposed top 62 and bottom 64 surfaces. An outer surface 60 extends around the blade body 66 vertically between the top 62 and bottom 64 surfaces. The blade body 66 includes a first 56 and second 58 aperture in spaced apart relation. A cutting edge 28 extends along an outermost periphery 29 of outer surface 60 of the blade 18. The outermost periphery 29 of outer surface 60 of the blade 18 may extend a distance L of typically between 5 and 50 centimeters and more preferably between 5 and 25 centimeters.

The first 56 aperture is a retainer structure that defines a blade body 66 axis of rotation 74 for pivoting movement. The second retainer structure 58 may be an elongated slot. The elongated slot 58 defines a first stop 68 and a second stop 70. The elongated slot 58 is adapted to limit the pivoting movement of the blade body 66 by way of its stops 68 and 70.

The top surface 62 of the blade 18 further includes a plurality of hardened beads 54 spaced apart and of a second hardness greater than the first hardness. The hardened beads 54 may comprise an amorphous metal laser clad material deposited along an extension 72 extending radially inward towards the mower disc body 22 and perpendicular or within 45 degrees of perpendicular to a tangent 48 along the convex cutting edge 28.

The blade body 66 further includes a tapered cutting face 60 formed into the bottom surface and intersecting the cutting edge 28. The tapered cutting face 60 is sandwiched between the top surface 62 and the bottom surface 64 of the blade body 66 and extends radially inward from the top surface 62 to the bottom surface 64. The cutting edge 28 is formed along the top surface 62. The blade body 66 may be comprised of a sheet steel formed component of a material thickness 80 (see FIG. 8) that is substantially uniform. Typically, the blade material thickness 80 is between 3 mm and 6 mm. Thereby, the blade 18 dimensions make it particularly adapted for use as a mower blade. It may be readily appreciated that it is not the intent to limit construction of the blade body 66 only to sheet steel. Comparable materials such as cast steel and stainless steel may be utilized to form the blade body 66.

The hardened beads 54 have a thickness 82 and are 10 to 30 percent of the material thickness 80. The steel material hardness of the blade body 66 is between HV 400 and 650 in the Vickers Hardness Scale. The hardened beads 54 are harder in comparison to the steel blade material and may comprise an amorphous metal having a Rockwell C (HRc) hardness greater than HRc 70. The hardened beads may be comprised of laser clad material deposited along a plurality of extensions 72 with each extension 72 spaced apart from the other extensions 72 and each extending transversely away from cutting edge 28 and radially inwards towards curved edge 32 of blade body 66. The benefit of this is to provide for a self-sharpening blade, that is as the softer blade body material wears away during use, the harder beads remain as the outermost periphery 29 of the blade 18 thereby providing for a serrated self-sharpened cutting edge 28.

Turning now to FIGS. 8 and 9, a top view of a mower disc assembly 16 and an elevated side view of the mower disc 16 assembly are illustrated.

A mower disc body 22 is adapted to rotate about a central axis 24. The mower disc body 22 includes an outer periphery 26. At least one blade 18 is mounted to the mower disc body 22 and extends radially outward from the outer periphery 26 of the mower disc body an X radial distance. The at least one blade 18 has a cutting edge 28 that extends along a length of a Y distance from a leading end 36 to a trailing end 38 of the cutting edge 28. The Y distance in a preferred embodiment the Y distance may be more than 1.5 times as great as the X radial distance. In a more preferred embodiment the Y distance may be two times as great as the X radial distance. In an even more preferred embodiment the Y distance may be 2.5 times as great as the X radial distance.

The functional benefit of the relationship between the X and Y distance is to provide a cutting edge 28 length beyond the mower disc body outer periphery 26 that facilitates the slicing action of the convex blade 18 as it moves through a crop 13.

In an embodiment the X distance will be between 5 and 15 centimeters. The Y distance will typically be between 5 and 50 centimeters and more preferably between 5 and 25 centimeters.

As illustrated, rotation about the central axis 24 of the mower disc body 22 is in a counterclockwise first direction 34. It can be readily appreciated in yet other embodiments the mower disc assembly 16 may very well be reoriented to rotate in a clockwise direction. Reference throughout the description is with respect to the mower disc assembly 16 adapted for counterclockwise rotation in first direction 34. However, the claims appended hereto are generic to both rotational directions.

The cutting edge 28 extends along a trailing path from a leading end or location 36 to a trailing end or location 38 relative to the central axis 24 in predetermined rotational movement defined by the mower disc body 22 when the blade 18 is mounted to the mower disc body 22. The leading location 36 and the trailing location 38 are separated in a preferred embodiment by an angular distance 44 of at least 120 degrees. In a more preferred embodiment the angular distance 44 is at least 30 degrees with the leading location and the trailing location separated between 5 and 25 centimeters.

In an embodiment the functional benefit of this may be to provide a cutting edge 28 length beyond the mower disc body outer periphery 26 that facilitates the slicing action of the convex blade 18 as it moves through a crop 13. The angular separation between the leading edge and the trailing end allow the crop to be sliced instead of impact cut as is the case with rectangular blades. The angular separation allows the crop 18 to slide along and remain in contact with the cutting edge 28 over a longer time and distance relative to a traditional rectangular blade impacting the crop along a limited surface of its blade. The slicing provided thereby increases blade 18 life because slicing produces less blade wear than an impact cut from a traditional rectangular blade, further such a blade 18 is more efficient in terms of harvesting the crop 13 and also demands less power to operate.

The cutting edge 28 includes a curved portion 46 that defines a tangent 48 that defines an acute angle 50 that is greater than 45 degrees with a radial extension 52 extending from the central axis. In that manner, the convex cutting edge 28 has an advantageous length that provides for the greatest amount of time and distance for the crop 13 to be sliced during operation.

The blade body 66 is connected to the mower disc body 22 at a hinge 56 that allows for articulating movement of the at least one blade 18. The blade body 66 is also connected to the mower disc body 22 at a slide retainer 58 at a location trailing the first hinge 56. The at least one blade 18 has an articulating movement limited by the slide retainer 58 between first stop 68 and second stop 70. Under centrifugal force generated by the mower disc boy 22 in rotation, the blade 18 is able to pivot about axis 74 until stopped by second stop 70 of the second hinge 58. Thus, the mower disc body 22 may rotate in a first direction 34 about the central axis of rotation 24 while the blade body 66 is simultaneously able to rotate about the blade body 66 axis of rotation 74 in a second and opposite direction of the first direction 34. The ability of the blade 18 to move in a direction opposite that of the mower body 22 together with beveled edge 60 provide the advantage of allowing the blade 18 to give way by rotating away from an obstruction and thereby prevent damage to the blade 18 if the instruction turned it out to be an immovable object. Further, this ability prevents such undesirable objects such as stones form being hurled into the air at tremendous velocities. Instead the blade 18 is able to pivot away from the object as the face 60 works to direct a downward force on the object further decreasing any projectile velocity.

When cutting crop with a knife blade, a slicing action rather than an impact/shearing action is more efficient. The way the slicing action in this embodiment is achieved is by facing the crop being cut with a cutting edge that has an oblique angle in relation to the rotating motion of the mower disc assembly into the crop being cut. Even more specifically this slicing action in this embodiment is achieved by facing the crop 13 being cut with a blade 18 that has the large convex cutting edge 28 over a radially inward tapered cutting face 60 where the taper extends radially inward from the top surface 62 to the bottom surface 64.

As the blade 18 is rotating, the stalks of the crop 13 come into contact with the convex cutting edge 28. The blade 18 begins to impact the stalk 13 and stalks 13 start sliding along the edge of the direction of least resistance. This happens in a matter of a very few milliseconds since the blade 18 is traveling at approximately 80 meters per second, but the effects of the sliding action are realized in the amount of energy used to sever the stalks is reduced.

The blade body 66 includes a leading hardened amorphous bead 76 and a plurality of trailing hardened amorphous beads 54. The trailing hardened beads 54 are located in series trailing the leading location 36. The laser clad metal beads 54 running tangent to the cutting edge 28 allow the cutting edge 28 to self-sharpen. That is, the blade body 66 of the first hardness wears at a much faster rate than the hardened metal beads 54 of the second hardness. Thus, as the softer material of the first hardness erodes radially inward the hardened beads 54 are left in place and create the desired self-sharpening effect of a serrated cutting edge 28.

Typically, a rectangular blade wears primarily at the corner of the outer leading edge of the blade. Further a conventional rectangular mower blade does not slice the crop as does the convex cutting edge 28, rather it impacts the crop to cut it. In this way, the typical rectangular blade quickly becomes dull and the cutting efficiencies continue to get worse until the blade is no longer useful. Thus, an advantage of the present embodiment is that the convex cutting edge 28 may provide four times the amount of cutting edge of a typical rectangular blade's cutting edge. Further, with the convex cutting edge 28 the cutting of the crop is distributed evenly along the entire length of the cutting edge 28 to provide an even wear pattern thus outlasting the conventional rectangular blade by approximately four times. Also, because the cutting of the crop 13 is evenly distributed along at the curved cutting edge 28, the cutting efficiencies will tend to remain the same from the start of the blade until it is completely worn out.

In an embodiment two blades 18 are mounted to the disc mower body 22 in diagonally opposed space relation. It can be readily appreciated the aforementioned mounting permits a balanced rotation of the mower disc body 22 about central axis 24. Accordingly, more or less blades 18 in yet other embodiments are envisioned. For example, an embodiment may have four blades 18 mounted to the mower disc body 22 provided they are opposed space relation and balanced when the mower disc body 22 is in rotation about central axis 24.

Turning now to FIGS. 10, 11 and 12, respectively, a bottom view, side view and top view of a blade 118 for a mower disc body 22 (FIG. 4) are shown. The blade 118 is similar in most respects to blade 18 (FIG. 5) previously discussed but differs in that graduated cutting teeth 184 are formed into the blade body 166 at the time the blade body 166 is formed which may be by stamping for a non-limiting example.

Thus, as with blade 18, blade 118 with its graduating cutting teeth 184 may be formed from sheet steel to include the blade body 166 of a hardness between HV 400 and 650 on Vickers scale. The blade body 166 has opposed top 162 and bottom 164 surfaces. An outer surface 160 extends around the blade body 166 vertically between the top 162 and bottom 164 surfaces. The blade body 166 includes a first 156 and second 158 aperture in spaced apart relation. A cutting edge 128 and extends along an outermost periphery 129 of outer surface 160 of the blade 118. The cutting edge 128 of outer surface 160 of the blade 118 may extend a distance L of typically between 5 and 50 centimeters and more preferably between 5 and 25 centimeters.

The blade body 166 may be comprised of a sheet steel formed component of a material thickness 180 that is substantially uniform. Typically, the blade material thickness 180 is between 3 mm and 6 mm. Thereby, the blade 118 dimensions make it particularly adapted for use as a mower blade. It may be readily appreciated that it is not the intent to limit construction of the blade body 166 only to sheet steel. Comparable materials such as cast steel and stainless steel may be utilized to form the blade body 166.

The blade body 166 includes a first 156 aperture that is a retainer structure that defines a blade body 166 axis of rotation 174 for pivoting movement. The second retainer structure 158 may be an elongated slot. The elongated slot 158 defines a first stop 168 and a second stop 170. The elongated slot 158 is adapted to limit the pivoting movement of the blade body 166 by way of its stops 168 and 170.

The top surface 162 of the blade 118 further includes a plurality of hardened beads 154 spaced apart and of a second hardness greater than the first hardness. The hardened beads 154 may comprise laser clad amorphous metal material deposited along an extension 172 extending radially inward towards the mower disc body 22 and perpendicular or within 45 degrees of perpendicular to a tangent 148 along the cutting edge 128. The hardened bead 154 has a maximum circumferential width 155 that extends along the cutting edge 128 of the top surface 162 of the blade body 166.

Unlike blade 18, here, the cutting edge 128 of the blade 118 includes the graduated cutting teeth 184. Thus the cutting edge 128 contains cutting segments 177 that break up the continuous cutting edge 128 of the previous embodiments discussed with respect to blade 18. Each tooth 184 is formed between each of the spaced hardened beads 154. Thus, the cutting edge 128 is comprised of a trailing edge portion 190, a center edge portion 194, and a leading edge portion 196. (FIG. 12). The leading edge portion may be free from any of the graduated cutting teeth 184 and extends along the outer surface 160 of the blade 118 a greater distance than any individual tooth of the graduated cutting teeth 184.

The trailing edge portion 190 and the leading edge portion 196 of the cutting edge 128 are similar in that each include a tapered cutting face 161 formed into the bottom surface 164 and intersecting the cutting edge 128. The tapered cutting face 161 is sandwiched between the top surface 162 and the bottom surface 164 of the blade body 166. The tapered cutting face 161 extends radially inward to the bottom surface 164 and forms in an embodiment an angle 163 between 30 and 60 degrees with the top surface 162 of the blade body 166. In a preferred embodiment the angle is between 30 and 45 degrees, and in a more preferred embodiment the angle is between 30 and 32 degrees. This same angle 163 is present in all the blade 18 embodiments heretofore described with respect to top surface 62 and cutting face 60, as cutting face 60 tapers radially inward to meet bottom surface 64 along the cutting edge 128.

The center edge portion 194 extends along the cutting edge 128 between the leading edge portion 196 and trailing edge portion 194 and comprises between 50 percent and 90 percent of the cutting edge 128 of blade 118.

The hardened beads 154 and the graduated cutting teeth 184 extend along the cutting edge 128 in the center edge portion 194 of the blade body 166. The center edge portion 194 in an embodiment may have 3 to 20 cutting teeth. In a preferred embodiment the center edge portion may have between 4 and 15 cutting teeth 184 and an even more preferred embodiment the center edge portion may have between 5 and 10 cutting teeth 184.

Turning now to FIGS. 13-14, each cutting tooth 184 of the center edge portion 194 is comprised of a tip face 186, a relief face 188 and a beveled cutting face 189.

The tip face 186 has a maximum beveled cutting face length 204 along top surface 162 that approximates a maximum circumferential length 155 of the hardened bead 154. The tip face 186 extends inward toward curved edge 132 and in a tapered fashion from the top surface 162 to the bottom surface 164 to form a tip face taper 212. The tip face taper 212 is intended to approximate the taper 161 of the leading edge portion and trailing edge portion of cutting edge 128.

The relief face 188 of the tooth 184 extends from approximately a tip face trailing edge 208 to an inward most beveled cutting face edge 210 of the beveled cutting face 189 and thereby providing a depth 187. Thus, the relief face 188 extends transversely and inwardly away from the outermost periphery 129 of the cutting edge 128. Typically the depth 187 is between 5 mm and 25 mm. In a preferred embodiment the depth is between 5 mm and 10 mm.

Further, the relief face 188 extends from the top surface 162 to the bottom surface 164. The relief face 188 and the beveled cutting face 189 meet to form and angle 202 between the two faces 188, 189 at the top surface 162 of the valve body 166. In an embodiment, the angle 202 may be between 60 and 120 degrees. In a preferred embodiment, the angle may be between 80 and 100 degrees. In a more preferred embodiment, the angle may be between 90 and 91 degrees. The relief face 188 and the beveled cutting edge face 189 are arranged to create a step 176.

The beveled cutting face 189 extends from a tip face trailing edge 206 to the inward most beveled cutting face edge 210 and thereby provides for a beveled cutting face length 191 of the beveled cutting face 189 extending along the top surface 162 of the blade body 166. The beveled cutting face length 191 along the top surface 162 is one of the cutting edge 128 segments 177 previously discussed. The beveled cutting face length 191 of each of the beveled cutting faces 189 gradually decrease, that is get shorter, with each tooth 184 the farther the graduated teeth 184 are from the leading end 136. (FIG. 12) The beveled cutting face 189 tapers radially inward from the top surface 162 to the bottom surface 164. The taper 210 of the beveled cutting face 189 may be obtained by sharpening on a machine such as a mill for example to provide a flat cutting edge and surface.

The hardened beads 154 have a thickness 182 and are 10 to 30 percent of the material thickness 180. The steel material hardness of the blade body 66 is between HV 400 and 650 in the Vickers Hardness Scale. The hardened beads 154 are harder in comparison to the steel blade material and comprise an amorphous metal having a Rockwell C (HRc) hardness greater than HRc 70. The hardened beads 154 may be comprised of laser clad material deposited along a plurality of extensions 172 with each extension 172 spaced apart from the other extensions 172 and each extending transversely away from cutting edge 128 and radially inwards towards curved edge 132 of blade body 166. The benefit of this is to provide self-sharpening for blade 118. That is, as the softer material of the blade body 166 wears away during use, the harder beads 154 remain to cut crop 13 (FIG. 1) and thereby improve the cutting action of the already serrated cutting edge 128. By such self-sharpening, the life of blade 118 is increased even more than that of the embodiments discussed with blade 18.

In addition to extending blade 118 life, other advantages of the cutting blade 118 with cutting teeth 184 include cutting crop 13 in nibbles, that is small bites, along the cutting edge 128. It can be readily appreciated that each tooth 184 provides for a slicing action in cutting crop 13 (FIG. 1) along the sharpened beveled cutting face 189 with length 191 that gets shorter and the relief face 18 that gets longer the farther the graduated cutting teeth are from the leading end 136. These graduated lengths provides optimal bites, that is cutting of the crop 13 in nibbles as crop 13 traverses the segmented central cutting edge portion 194. Further, advantage is found with this embodiment as just discussed with the self-sharpening of the blade 118 that is the result of the wearing away of the blade body 166 material that is softer than that of the hardened beads 154. Thus, the cutting efficiency and blade life are thereby extended by this particular blade body 118 with the cutting teeth 184 along the center edge portion 194 of the cutting edge 128.

In the prior embodiment, it can be seen that the laser cladding may be deposited along a direction transverse (such as perpendicular) to the edge or the cutting edge. However, with the thinner laser clad depositions of under 1 millimeter, the cladding may be applied parallel to the cutting edge instead. This can be applied to other cutting blade embodiments such as shown in FIGS. 15, and 16 described below where the cladding extends along a length that is parallel to the cutting edge as opposed to traverse as in the first illustrated embodiment. Parallel or traverse extending amorphous claddings can be applied to and substituted for claddings in any of the following applications (using the parameters set forth herein for the various embodiments): US2013/0233145 entitled Laser Clad Cutting Edge for Agricultural Cutting Components, the entire disclosure of which is hereby incorporated by reference in its entirety; US2013/0111863A1 entitled Disc Mower Blades, the entire disclosure of which is hereby incorporated by reference in its entirety applied (the cladding would be applied to a side or material thickness edge of the blade); or U.S. patent application Ser. No. 14/177,356 filed Feb. 11, 2014 and entitled "Machine Part With Laser Cladding and Method" the entire disclosure of which is hereby incorporated by reference in its entirety (demonstrating the amorphous could be applied other agricultural parts to include blunt edges of such parts such as disclosed therein). Each of these are assigned to the present assignee. Some of these embodiments with reference to the aforementioned applications also demonstrate that in certain situations, it is contemplated to form the cladding on the material thickness edge as opposed to the side surfaces of the part. However, various embodiments herein contemplate building the edge along the side rather than the material thickness edge.

Referring to FIGS. 15 and 16, a exemplary grass knife 200 embodying the present invention is shown. It is understood that this blade would be attached to a rotor support with multiple grass knives, not unlike the rotor shown in the embodiment of FIGS. 1-14. Grass knife 200 is a generally planar blade having a first side 202 and a second side 204, thereby defining a body 212 having a thickness 214. Grass knife 200 also has a width 203 and a length 205, the width 203 and length 205 are each at least 5 times or more than the thickness 214. FIG. 16 shows a side view of the blade of FIG. 15, shown from right side 201 of FIG. 15. Grass knife 200 is further provided with an angled cutting face 206. Angled cutting face 206 is disposed between first side surface 202 and second side surface 204 at a sharpness 210, thereby defining a cutting edge 211 extending transversely across blade body 212. Sharpness 210 is defined by the angle between bottom surface 204 and cutting face 206. In the embodiment shown, sharpness 210 is 39 degrees. In other embodiments, angle 210 may be about 40 to 45 degrees or about 39 to 35 degrees. Grass knife 200 is further provided with a hard facing area 208 disposed on second side surface 204, along width 203 of blade body 212 and proximate to cutting edge 211. Thus, in this embodiment the cladding is deposited in a strip parallel to cutting edge 211, as opposed to strips transverse to the cutting edge (as shown in the embodiment of FIGS. 1-14).

The steel material hardness of the blade body 212 may be between HV 400 and 650 in the Vickers Hardness Scale. The hard facing area 208 is harder in comparison to the steel blade material and may comprise an amorphous metal having a Rockwell C (HRc) hardness greater than HRc 70. The hard face area may be comprised of laser clad material deposited proximate to sharpness 210 of blade body 212. In preferred embodiments, the cladding forming hard facing area 208 may be between 0.25 mm and 1.0 mm in thickness. The benefit of this is to provide for a self-sharpening blade, that is as the softer blade body material may wear away during use, the harder facing remains at the cutting edge 211 of the grass knife 200, thereby providing for a self-sharpened cutting edge 211.

Figure 17:
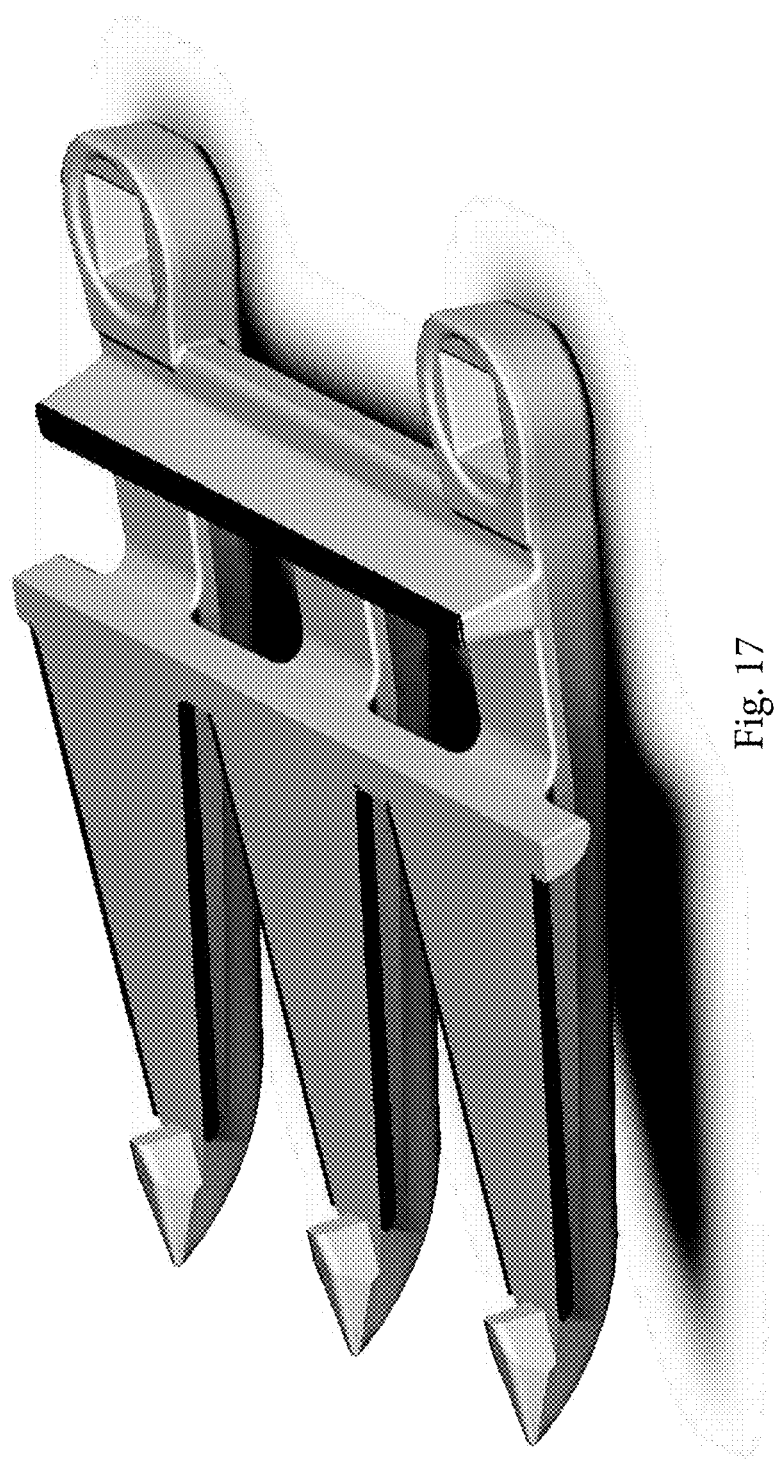
FIG. 17 is an isometric view of an exemplary knife guard of the present invention.

Referring to FIG. 17, an exemplary machine part embodying the present invention is shown. Knife guard 220 is a high wear agricultural machine part, typical of a knife guard used in sickle style cutting systems. They act as the stationary surface for reciprocally-moving sickle blades to cut against, and may also protect or cover the sickle blades. Examples are shown in U.S. Pat. Nos. 6,962,040, 4,660,361, 7,478, 522, and 8,464,506, the disclosures of which are incorporated by reference in their entirety. Knife guard 220 comprises a guard body 222 and is comprised of a base material having a first hardness, such as a steel material. Knife guard 220 includes a ledger surface 224. Typically the ledger surface 224 contacts a sickle bar assembly having sickle blades, thereby guiding and maintaining linear reciprocating movement of the sickle bar assembly. Ledger surface 224 of knife guard 220 may be provided with a laser clad material 228, wherein the clad material is applied to outer edges 226 of ledger surface 224 and forms a shear edge that works in conjunction with the sickles blades of sickle bar assemblies. In preferred embodiments, the cladding 230 applied to outer edges 226 may be between 0.25 mm and 1.0 mm in thickness. A cladding material 230 may also be applied to other high wear portions of a knife guard, such as ledger bar 228. In additional embodiments, a cladding material may be applied to other blade support structures, such as a support rotor for agricultural cutting blades.

In embodiments where a machine part of any of the preceding embodiments has an axis of rotation, an amorphous metal cladding material may be preferentially applied to areas subject to higher wear conditions. For example, the cladding material may be deposited on the outermost 20 percent of the rotational machine part, distal from the axis of rotation. In another embodiment, the cladding material may be deposited on the outermost 10 percent of the rotational machine part, distal from the axis of rotation. In still another embodiment, the cladding material may be deposited on the outermost 50 percent of the rotational machine part, distal from the axis of rotation. In such embodiments, the cladding material may be applied to the distal cutting edge of a rotating blade from the rotational axis, while the cutting edge of the blade proximate to the rotational axis may be untreated.

In some embodiments, an amorphous metal cladding material may be applied to the entire length of the edge of a rotating cutting blade, and the thickness of the cladding material may be increased with distance from the rotational axis. For example, a rotational cutting blade may have a first thickness of cladding material proximate to the rotational center, and a second thickness of cladding material at the edge distal to the rotational axis. The thickness of the cladding material may increase smoothly (for example, linearly) from the first thickness to the second thickness along the length of the cutting edge, or may increase in a step-wise fashion.

In other embodiments, an amorphous metal cladding material may be applied to non-rotating blades, that is, blades having a linear or reciprocal cutting motion. The cladding material may be selectively applied to the leading edge of a cutting blade, for example the surface of the blade proximate to the cutting edge of the blade. In some embodiments, the cladding material covers less than 20 percent of the surface area of the cutting blade. In more preferred embodiments, the cladding material covers less than 10 percent of the surface area of the cutting blade. In still more preferred embodiments, the cladding material covers less than 10 percent of the surface area of the cutting blade. The cladding material may be applied directly to a blade part to form a sharpened edge, or the blade part may be machined or sharpened after cladding to form a sharpened edge. Additionally, in embodiments where a cutting blade is serrated before cladding, a cladding material may be applied to the serrations. In still other embodiments, a cladding material may be applied in discreet segments, such as lines, cross-hatching, or curves, to a blade to created raised serrations on the blade surface.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A machine part for agricultural, turf, mining or construction equipment for processing material, comprising:
a body comprising a base material of a first hardness;
a clad material deposited on the base material and forming at least one edge along the body, the clad material comprising a second hardness greater than the first hardness, wherein the clad material is at least partially amorphous and wherein the clad material forms a dilution zone at a juncture between the clad material and the base material, the dilution zone being a metallurgical bond between the base material and the clad material.

2. The machine part of claim 1, wherein the machine part includes a material thickness defined between two sides, the two sides defining width and length spans that are each at least 5 times or more than the material thickness, wherein a material thickness edge forms a periphery of the body and extends between the two sides, wherein the material thickness edge extends transversely between the two sides.

3. The machine part of claim 2, wherein the clad material is deposited along the one of the two sides.

4. The machine part of claim 2, wherein the clad material is deposited along the material thickness edge.

5. The machine part of claim 3, wherein the body comprises a sheet steel formed component part having a substantially uniform material thickness.

6. The machine part of claim 1, wherein the clad material is applied to less than 15 percent of surface area of the machine part.

7. The machine part of claim 1, wherein the clad material comprises less than 5 percent of the machine part by weight.

8. The machine part of claim 2, wherein the material thickness edge defines an angled cutting edge.

9. The machine part of claim 8, wherein the angled cutting edge defines an acute angle between 30 and 60 degrees.

10. The machine part of claim 1, wherein the clad material is at least 10 percent amorphous.

11. The machine part of claim 1, wherein the clad material is at least 50 percent amorphous.

12. The machine part of claim 1, wherein the clad material has a maximum thickness of no greater than 1 millimeter in the direction of deposition.

13. The machine part of claim 1, wherein the clad material is deposited in a strip having a width of greater than 3 millimeters and length at least 5 times longer than the width.

14. The machine part of claim 1, wherein the machine part includes a cutting edge, the clad material forming the cutting edge or being deposited adjacent to the cutting edge.

15. The machine part of claim 13, wherein the machine part includes a material thickness defined between two sides, and further comprising an angled cutting face extending intermediate of the two sides to a tip that defines the cutting edge, at least part of the angled cutting face being free of the clad material and being an exposed surface of the base material.

16. The machine part of claim 1, wherein the clad material comprises an at least partially amorphous material having an elemental composition comprising by molar percent Fe>18.0 percent, Cr<20.0 percent, W<15.0 percent, B<10.0 percent, Nb 10.0 percent, Mo<10.0 percent, V<5.0 percent, Mn<5.0 percent, C<5.0 percent, and Si<2.0 percent.

17. A machine part for agricultural, turf, mining or construction equipment for processing material, comprising:
a body comprising a base material of a first hardness;
a clad material deposited on the base material and forming at least one edge along the body, the clad material comprising a second hardness greater than the first hardness, wherein the clad material is at least partially amorphous, and
wherein the clad material comprises an at least partially amorphous material having an elemental composition comprising by molar percent Fe>18.0 percent, Cr<20.0 percent, W<15.0 percent, B<10.0 percent, Nb 10.0 percent, Mo<10.0 percent, V<5.0 percent, Mn<5.0 percent, C<5.0 percent, and Si<2.0 percent.

18. A method of laser cladding at least one surface of a machine part comprising a base material of a first hardness, the method comprising:
laser cladding a cladding material onto a surface of the machine part to provide a hardened region with a second hardness greater than the first hardness, wherein the cladding material comprises an amorphous metal wherein the clad material forms a dilution zone at a juncture between the cad material and the base material the dilution zone being a metallurgical bond between the base material and the clad material; and
configuring the surface to engage with a flow of agricultural material.

19. The method of claim 18, wherein the cladding material is an amorphous metal powder prior to laser cladding.

20. The method of claim 18, wherein the cladding material is at least 10 percent amorphous after laser cladding.

21. The method of claim 18, wherein the cladding material is at least 50 percent amorphous after laser cladding.

22. The method of claim 18, wherein the cladding material does not include a carbide.

23. The method of claim 18, wherein the machine part is selected from the group consisting of a chopper, a fan blade, an auger flight, a grain elevator component, a knife guard, and a blade support.

24. The method of claim 18, wherein the machine part is selected from the group consisting of a knife blade, a sickle blade, a serrated blade, and a rotary blade.

* * * * *

UNITED STATES PATENT AND TRADEMARK OFFICE
CERTIFICATE OF CORRECTION

PATENT NO. : 9,717,176 B2
APPLICATION NO. : 14/855028
DATED : August 1, 2017
INVENTOR(S) : Neal J. Stoffel et al.

Page 1 of 1

It is certified that error appears in the above-identified patent and that said Letters Patent is hereby corrected as shown below:

In the Claims

In Line 34 of Claim 18, the word "cad" should be replaced with --clad--

In Line 34 of Claim 18, a --,-- should be inserted after the word --material--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*